United States Patent
Rink et al.

[11] Patent Number: 6,007,097
[45] Date of Patent: Dec. 28, 1999

[54] FLAMMABLE GAS INITIATED PYROTECHNIC INFLATOR

[75] Inventors: Karl K. Rink, Liberty; Wesley L. Hatt, Centerville; Steven R. Pripps, North Ogden; David W. Lindsey, Ogden; David J. Green, Brigham City; Scott A. Jackson, Centerville; Donald J. Cunningham, No. Ogden, all of Utah

[73] Assignee: Autoliv ASP, Inc., Ogden, Utah

[21] Appl. No.: 09/093,888

[22] Filed: Jun. 9, 1998

[51] Int. Cl.⁶ .................................................. B60R 21/26
[52] U.S. Cl. ........................................... 280/737; 280/741
[58] Field of Search .................................... 280/737, 741

[56] References Cited

U.S. PATENT DOCUMENTS

| | | | |
|---|---|---|---|
| 3,689,105 | 9/1972 | Matsui et al. | 280/737 |
| 3,822,895 | 7/1974 | Ochiai. | |
| 5,226,669 | 7/1993 | Honda | 280/737 |
| 5,429,387 | 7/1995 | Clark. | |
| 5,470,104 | 11/1995 | Smith. | |
| 5,577,769 | 11/1996 | Di Giacomo et al. | 280/737 |
| 5,649,720 | 7/1997 | Rink. | |
| 5,664,802 | 9/1997 | Harris et al. | 280/737 |
| 5,669,629 | 9/1997 | Rink. | |
| 5,692,776 | 12/1997 | Rink. | |
| 5,700,030 | 12/1997 | Goetz | 280/737 |
| 5,736,668 | 4/1998 | Fogle. | |

*Primary Examiner*—Kenneth R. Rice
*Attorney, Agent, or Firm*—Sally J. Brown

[57] ABSTRACT

A method and apparatus for igniting a pyrotechnic gas generator, or inflator, such as those used in automotive airbag systems is disclosed. The ignition system uses a flammable gas to ignite the pyrotechnic gas generant. The flammable gas can be stored either throughout interior free space in the inflator or it can be maintained in a separate sealed container either separately or jointly with the pyrotechnic gas generant. The method and apparatus offer both cost savings and a reduction in delay time over conventional pyrotechnic ignition systems.

27 Claims, 4 Drawing Sheets

FLAMMABLE GAS INITIATED PYROTECHNIC INFLATOR

BACKGROUND OF THE INVENTION

1. Field of the Invention

This invention is directed to an inflator, or gas generator, used to rapidly provide a quantity of non-toxic gas suitable for inflating an inflatable article, such as the inflatable cushion of an airbag passive restraint system as used in modern vehicles. The invention is particularly directed to those inflators which rely on the ignition of solid pyrotechnic materials to create the required inflation gases.

2. Description of Related Art

Airbags which actuate in response to a collision to protect the occupants of a vehicle from more serious injury by providing a cushion between the occupants and the interior surfaces of the passenger compartment have become increasingly popular in modern vehicles due to their proven effectiveness. Airbag systems typically include one or more airbags mounted in a folded, deflated condition in a storage area in the passenger compartment. In the event of a collision, a crash sensor mounted on the vehicle's frame or body detects the sudden deceleration of the vehicle and electrically triggers activation of the airbag. Typical prior art airbag systems include a gas generator, or inflator, which contains a pyrotechnic gas generating material, or gas generant, which is capable, upon ignition, to rapidly form sufficient gas to inflate the associated airbag. The system also includes an initiator, such as an electric squib, and an igniter or a similar ignition enhancing charge of a rapidly igniting material, such as boron potassium nitrate ($BKNO_3$). Upon receipt of a triggering signal from the crash sensor, the initiator fires causing the rapid combustion of the rapidly igniting material, which, in turn, ignites the slower burning gas generant.

Airbag systems used on the passenger side of vehicles are usually mounted at a location behind the instrument panel/ dashboard. As described in U.S. Pat. Nos. 4,005,876, to Jorgenson et al., issued Feb. 1, 1977, and 4,878,690, to Cunningham, issued Nov. 7, 1989, such systems usually include a gas generator having a cylindrical housing. An electric initiator, or squib, is located at one end of the housing so as to fire upon a linear igniter comprising an igniter tube extending along the axis of the housing. The igniter tube is loaded with igniter granules, and often includes a fuse of rapid deflagration cord (RDC) extending along the tube's axis and surrounded by igniter granules whereby it assures even ignition along the length of the inflator. One end of the igniter tube is closed with a screen which retains the igniter granules while permitting ignition of the granules by an auto-ignition device in the event of a vehicle fire. An exposed length of the RDC and a stand of f distance between the igniter and the auto-ignition device are critical features which must be closely monitored during assembly of the inflator to assure proper operation of the auto ignition device. The gas generant material, in pellet or wafer form, surrounds the igniter tube along the length of the housing. The gas generant material, in turn, is surrounded by a filtering and cooling structure which cools the generated gas and filters particulates therefrom prior to the gas discharging through openings in the cylindrical wall of the housing to the interior of the airbag, thereby inflating same. Many variations of the prior art inflators and their linear igniters are presently in use and work well. Such variations include those described in U.S. Pat. Nos. 5,620,205 and 5,626,360. These igniters, however, require labor intensive assembly and are generally comprised of many components, some of which are costly.

Igniters have also been designed to be mounted at one end of elongated cylindrical gas generators. Such an igniter, which uses a particulate or granular ignition material, is described in commonly assigned U.S. Pat. No. 5,409,259, granted Apr. 25, 1995 to Cunningham et al.; and in a continuation-in-part application of that patent, Ser. No. 08/106,291, entitled "Gas Generator For Vehicle Occupant Restraint System", filed on Aug. 13, 1993. An end mounted pyrogen igniter which includes a solid grain of a pyrotechnic gas generant material is disclosed in U.S. Pat. No. 5,623,115.

The igniters of the prior art are relatively expensive to make and install. Additionally, they contain non-consumable materials which can produce hot particulate residue that must be removed from the generated gas to prevent its damaging the airbag during the inflation thereof. Vehicle vibrations can cause some igniters to break. Moreover, some igniters have caused the associated solid gas generant to break or disintegrate during ignition, resulting in the inflator exhibiting non-uniform and poorly controlled burn and inflation gas delivery characteristics. Finally, the delay time occurring between receipt of the activation signal and pressurization of the airbag during which the various materials in the ignition train sequentially ignite can be longer than is optimum. A need continues to exist for less complicated, more easily assembled and less costly ignition systems which provide rapid and uniform ignition, while maintaining a high degree of safety and reliability.

SUMMARY OF THE INVENTION

The present invention provides an ignition system for pyrotechnic inflators which involves the use of a spark, heat or shock generating initiator to ignite a flammable gas mixture (including gases which dissociate exothermically) which, in turn, ignites a charge of solid pyrotechnic gas generant. The invention results in inflators, or gas generators, wherein the prior art igniters, or similar solid ignition enhancing materials, are replaced, in whole or in part, by a flammable gas atmosphere provided adjacent the charge of solid pyrotechnic gas generant. In some cases the squib provided with prior art inflators can be replaced by a spark generator or a localized heating element.

DETAILED DESCRIPTION OF THE INVENTION

Figure 1:
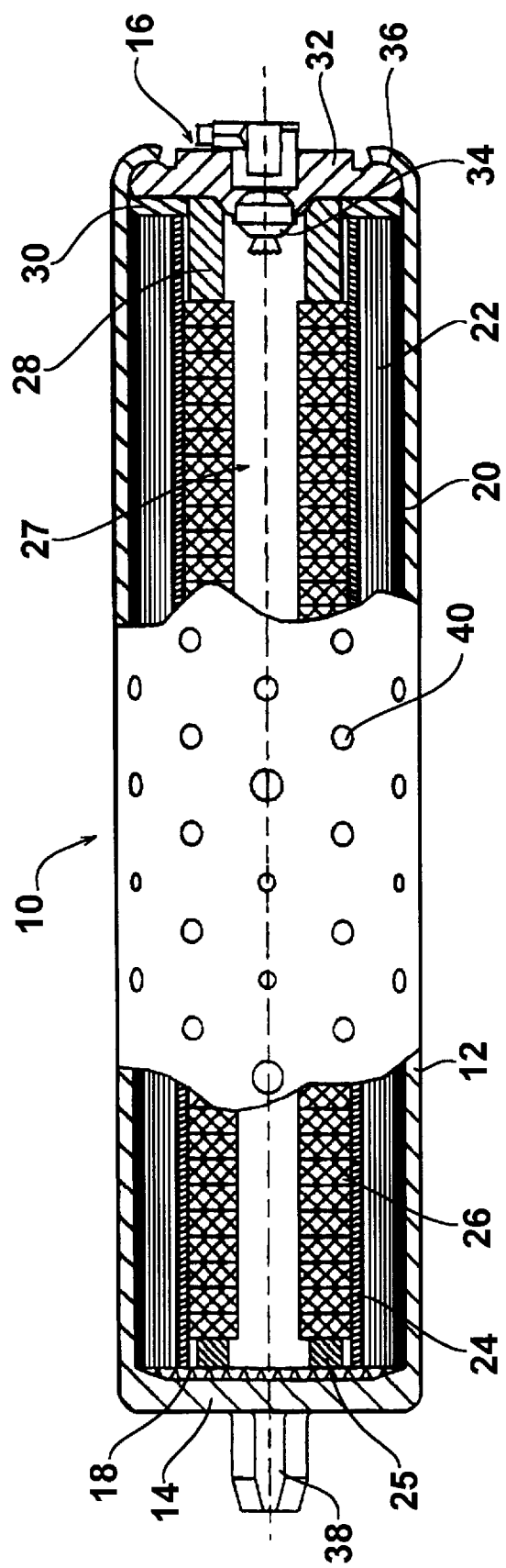
FIG. 1 is a partially cut away view of an inflator according to the present invention.

A passenger side inflator in accord with the present invention is illustrated in FIG. 1. The inflator 10 comprises a cylindrical housing 12 which extends from an integral end closure 14 to an end closure assembly 16. Located within the housing 12, and in the approximate order in which they are assembled therein, are a rubber gasket pad 18, a cylindrical filter assembly 20 which includes a cylindrical wire mesh filter 22 and an optional perforated steel tube inner wall 24, a ring shaped shock absorbing spacer 25 formed of a compressed non-woven matte of metal fibers, and stacked ring shaped wafers 26 of a gas generating pyrotechnic solid material. An ignition channel 27 extends along the axis defined by the central hole of the stacked ring shaped wafers 26. Prior to assembling the end closure assembly 16 in the housing 12, a further ring shaped compressible shock absorbing spacer 28 is provided adjacent the stacked wafers and a further rubber gasket material 30 is provided overlying the end of the filter assembly. The end closure assembly 16 includes an end closure plate 32 having an opening through which an externally actuated initiator 34 is mounted. The end closure plate 32 is inserted in the cylindrical housing 12 and the open end of the housing is swaged around the outer rim 36 of the closure plate providing a fluid tight seal between the housing 12, the end closure plate 32 and the gasket material 30. The initiator 34 is assembled in a fluid tight manner in the end closure plate 32 either before or after the plate 32 is assembled in the cylindrical housing 12. Preferably, the initiator and the end closure plate are hermetically sealed whenever the firing end of the initiator is directly exposed to the flammable gas. A mounting stud 38 is provided on the integral end closure 14 for mounting the inflator in an airbag canister. Exit ports 40 are provided around the longitudinal wall of the cylindrical housing 12. An adhesive backed foil layer on the interior of the longitudinal wall of the cylindrical housing 12 provides a breakable seal over the exit ports 40.

A flammable gas is charged to the interior of the inflator either prior to the end closure assembly 16 and the cylindrical housing 12 being assembled to a fluid tight condition, or through a suitably located charging port after the end closure assembly 16 and the housing 12 have been assembled to a fluid tight condition. The flammable gas can be any flammable gas, or mixture of gases which (a) will ignite when exposed to activation of the initiator, (b) will not cause degradation of the pyrotechnic gas generant, or the other materials used to form the inflator, over the extended lifetime of the vehicle or other device in which the inflator is to be used, and (c) do not form toxic ignition products with any material used in the inflator. Preferably, the flammable gas is gaseous at −40° C. and above. Suitable gases include mixtures of fuels and oxidizers, or exothermically decomposable gases. Suitable fuels include hydrogen, hydrocarbons such as methane, ethane, propane and/or butane, oxygen containing organic compounds, such as ethers, including dimethyl ether. Suitable oxidizers include nitrous oxide ($N_2O$) and oxygen containing gases such as air or oxygen. References to flammable gases in this application are intended to include exothermically decomposable gases which upon activation release a great deal of heat. Suitable exothermically decomposable gases include nitrous oxide ($N_2O$), acetylene-based materials, certain organic peroxides, and hydrazine compounds. Any of the flammable gases can also include inert gases, such as argon, helium, nitrogen or krypton. A small amount of helium, krypton-85 or another radioactive gas may be included to provide increased detectibility during leak checking.

The flammable gas is primarily provided to rapidly and controllably transmit the ignition which occurs in the vicinity of the initiator to the exposed surfaces of the solid pyrotechnic gas generating material. It is not intended to significantly contribute to the volume of inflation gas product. In this embodiment, while the flammable gas can be provided at elevated pressures, it is preferred that the gas be provided at a pressure not greater than 20 psig (at a standard temperature of 70° F.), and it is particularly preferred that the gas be provided at atmospheric pressure in order to minimize potential leakage problems.

The solid pyrotechnic gas generating material can be any of such materials which are recognized to be useful in inflators. Azide materials, such as sodium azide, mixed with an oxidizer, such as a metal oxide, have been the standard in the industry. Recently a new generation of pyrotechnic materials, including tetrazole compounds, triazole compounds, metal salts of dicyanamide, nitrate salts of amines, including substituted amines, and salts of 5-nitrobarbituric acid or 5-nitroorotic acid, which are often referred to non-azide generants or high reaction temperature generants, have been developed. In addition to metal oxides, suitable oxidizers for use in the gas generant include chlorates, perchlorates and nitrates. Any of these materials may be used in the present inflators. The pyrotechnic may be provided as washer-shaped wafers as shown in the inflator of FIG. 1, or it may be provided as pellets, granules or as a single grain. As is well known, the shape of the pyrotechnic determines the external surface area available for its initial ignition and the rate at which additional pyrotechnic is presented to the flame front thereafter. Accordingly, the shape is an important parameter affecting the burn characteristics of the gas generant charge. In those cases where the pyrotechnic charge is provided with a defined shape (as contrasted to a random mix), such as the depicted stacked wafers or as a single grain, the ignition rate can be modified by adjusting the total surface area and location presented to the flammable gas atmosphere. For instance, rather than providing a single central ignition channel 27, a series of ignition indents, protuberances, or channels may be provided either at the exterior surface of the charge or extending through the charge at a plurality of locations. By providing for the initial ignition to occur at the external surface of the pyrotechnic charge, the generated gases will not need to pass through the as yet unignited portion of the charge, and possibly break such, as they pass to the inflator exit ports 40. Additionally, by providing channels or protuberances having planes which bisect at acute angles, such as a channel having a star shaped cross-section, the ignition reliability is enhanced over that of a similar channel having a round cross-section.

The structural components of the inflator can be made fron metals, such as steel, aluminum or titanium. Steel is generally preferred from a cost standpoint, however aluminum and titanium can offer advantages in applications which seek to minimize the assembly's weight. When aluminum is used, a material having an auto-ignition temperature in the range of 300° to 450° F. may be provided in the inflator to assure that, in the event of a warehouse or vehicle fire, the flammable materials therein ignite prior to the elevated temperature causing the aluminum components to lose their structural strength. In some embodiments of this invention, particularly those which use a pressurized flammable gas, the flammable gas can be selected so as to provide for autoignition at the desired autoignition temperature. U.S. Pat. No. 5,494,312, "Autoignition of a Fluid Fueled Inflator", describes the selection of fluid fuels to provide for autoignition and is hereby incorporated by reference.

The initiator 34 can be any device which, when activated by receipt of an external signal, will ignite the flammable material with which it is used. Such can be a device which responds to an electrical signal by producing a localized hot spot, such as an electrical resistance heater or electrodes defining a spark gap. Alternatively, it can be a laser device which generates a laser beam capable of producing a hot spot where it impinges or otherwise heats the flammable material to its ignition point. Other initiators could rely on an electrically released spring driven firing pin, or hammer, striking a percussion cap. Squibs, wherein an electrically generated hot spot ignites a pyrotechnic material, are still another type of effective initiator.

Figure 2:
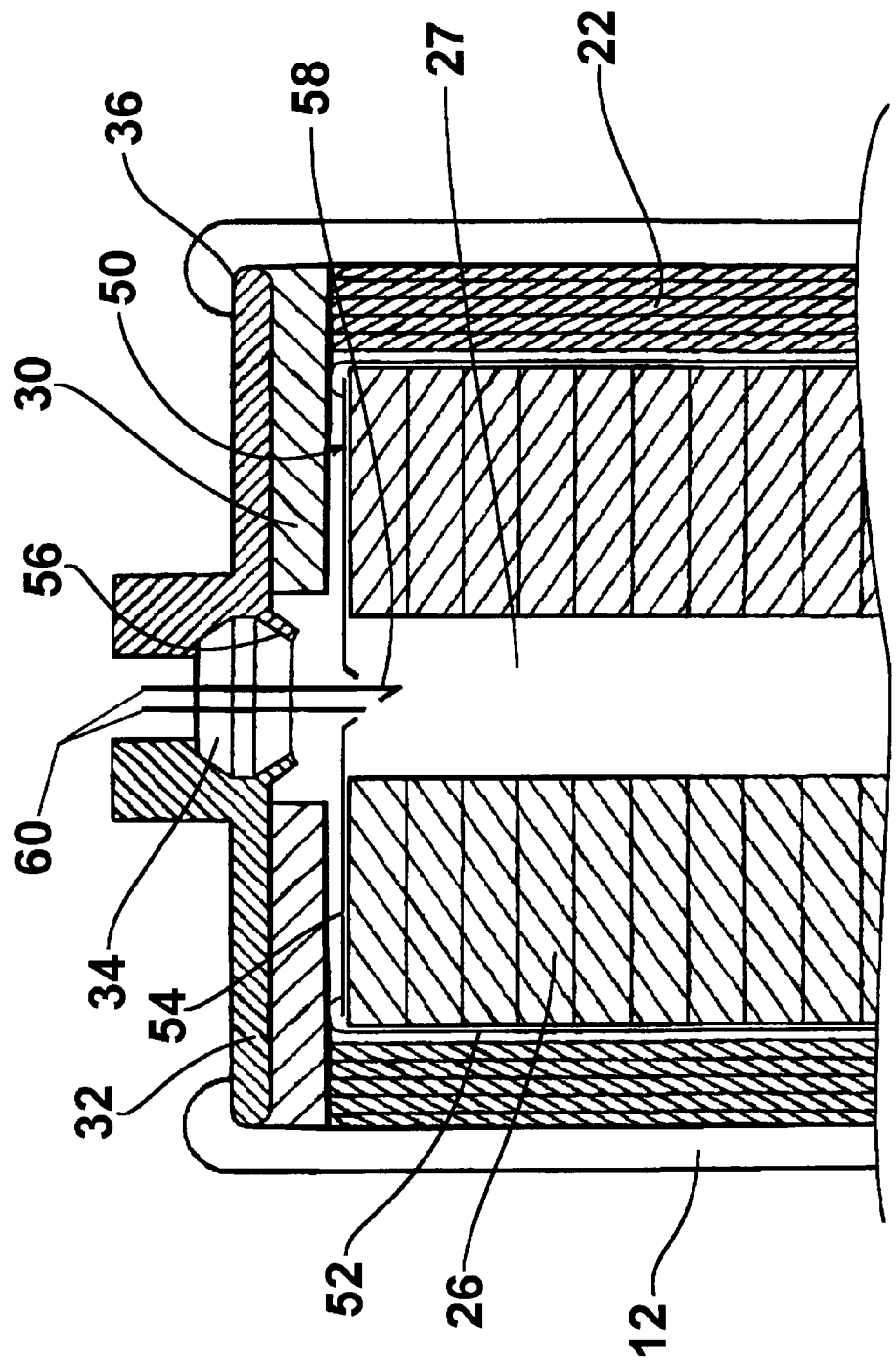
FIG. 2 is a partial view of a preferred embodiment of the present invention.

A further embodiment of the present invention is schematically illustrated in FIG. 2. This embodiment is similar to that of FIG. 1 and relies on the same item numbers to identify similar components. The principal difference is the provision of the pyrotechnic gas generant and at least a significant portion of the flammable gas in a sealed foil container 50 comprising a foil cartridge 52 and a foil disc 54. The container is loaded into the housing 12 as a sealed unit. In the embodiment illustrated in FIG. 2, after the filter 22 is placed in the cylindrical housing 12, the sealed foil container is placed in the housing and the rubber seal 30 is placed over the both the filter 22 and the foil container 50. The initiator 34 is located in the end closure plate 32 and rims 56 are swaged against the wall of the initiator 34 thereby sealing it in place. The assembled end closure assembly is then located atop the rubber seal 30 in the housing 12. The end closure assembly is pressed into the rubber seal creating a pressure tight seal as the ends of the cylindrical housing are swaged around the circumference of the end closure plate. The seal of the foil cylinder is broken during assembly by a piercing point 58 provided on one of the spark generating electrodes 60 of the initiator 34. Preferably, the piercing point 58 is located so that it breaks the seal after the rubber gasket material 30 is in contact with the end closure plate 32. Alternatively, the piercing point could be provided as an individual element which is advanced to a piercing position after the end closure assembly is fully assembled and the inflator is fluid tight.

In a further variation of the FIG. 2 embodiment, the sealed container can be maintained in a sealed condition until the inflator is activated. Maintenance of the container in a sealed condition provides assurance, additional to that provided by the fluid tight inflator housing, that the fluidized gas does not leak due to rough handling during assembly or due to undetected minute leakage paths over the extended lifetime, often fifteen years or more, of the vehicle in which the airbag system is mounted. In this case, activation of the initiator causes both opening of the sealed container and ignition of the released flammable gas. An initiator in which an ignited pyrotechnic charge propels a projectile or a piston at the sealed container and also provides glowing hot solid particulates is particularly effective for opening the container and igniting the released flammable gas. Suitable initiators which (a) deploy either projectiles or pistons to cause the release of ignitable gases, and (b) provide an ignition source for the released gases are described in U.S. Pat. No. 5,649,720, which is hereby incorporated by reference. A laser initiator is also suitable since the laser beam can be directed to melt the thin foil and, in the process, produce a hot spot capable of igniting the flammable gas. A still further suitable initiator provides electrical contacts which, when assembled, make contact with contact pads at opposite ends of an electrical resistance coating, film or wire provided on the sealed container. Such an electrical resistance device could be coated on the thin film used to form the container by vacuum deposition or chemical vapor deposition, or it could be adhesively applied thereto. Application of an electrical current to the electrodes causes the temperature of the electrical resistance device to rise, ignite the flammable gas and cause the container to open.

The sealed container is formed from a sheet material which is impermeable to the components present in the flammable gas. Thin metal foil, plastic film and metal-coated plastic film are suitable sheet materials which have been extensively used in packaging, and, for which, sealing apparatus and methods have been developed and are readily available. The container can be formed from a foil cartridge and one or two (one at each end) foil discs, as illustrated, or it can be formed from a single folded sheet with its overlying, adjacent edges sealed forming a sealed envelope.

With the possible exception of a flammable gas which relies on a mixture of a fuel and an oxidant, the entire charge of flammable gas is preferably provided in the sealed container. When the flammable gas comprises a fuel-oxidant mixture, it is preferred that all of the fuel and a portion of the oxidant be provided in the sealed container. A portion of the required oxidant, equivalent to the oxygen content of air sealed in those portions of the enclosed volume of the inflator outside of the sealed container, can be omitted from the flammable gas mixture charged to such container.

Figure 3:
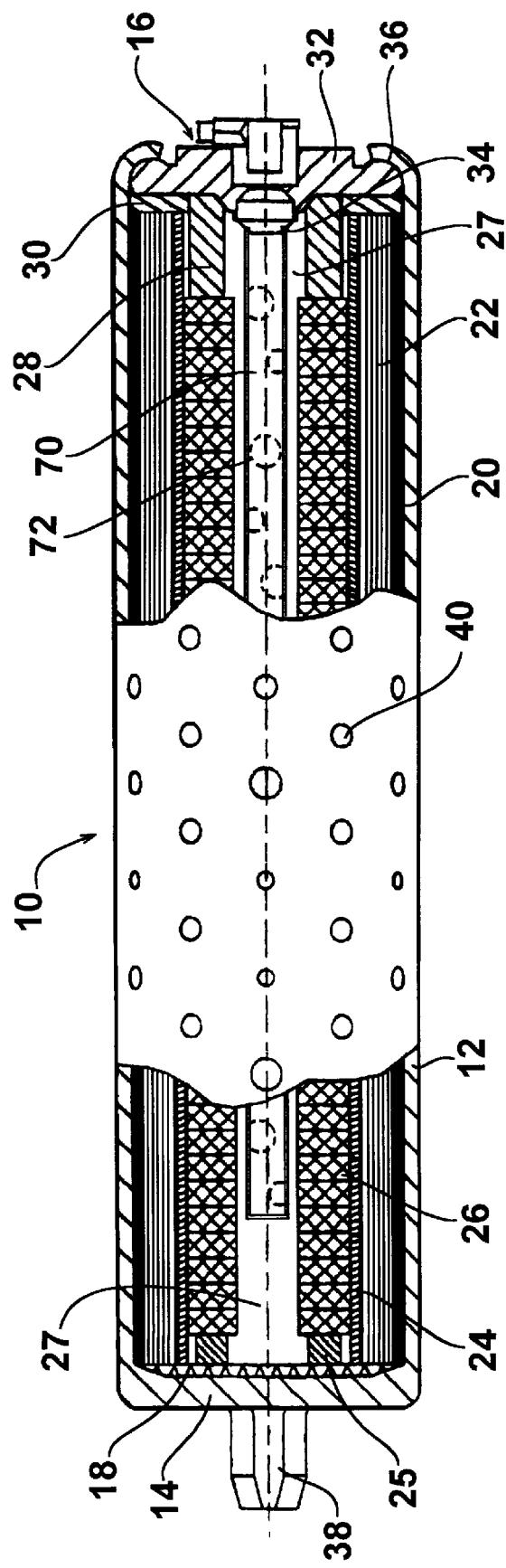
FIG. 3 is a partially cut away view of a further preferred embodiment of the present invention.

A further preferred embodiment provides the flammable gas in a hermetically sealed container which does not contain the solid pyrotechnic gas generant. The container can also mount an initiator device in operative contact with the gas. The hermetically sealed container includes structure which upon activation opens to allow the heated ignition products of the ignited flammable gas to be directed at the pyrotechnic gas generant through the openings. An example of such a preferred embodiment is illustrated in FIG. 3. An inflator similar to those illustrated in FIGS. 1 and 2 includes cylindrical housing 12 in which a cylindrical filter assembly 20 and stacked gas generating pyrotechnic ring shaped wafers 26 are assembled. An ignition channel 27 extends through the aligned central holes of the wafers, generally along the axis of the cylindrical housing. A hermetically sealed container in the form of an ignition tube 70 extends into the ignition channel 27 from its mounting to the end closure 32. The end of the ignition tube extending into the ignition channel 27 is closed, either by an integral or a welded closure. The other end of the ignition tube is hermetically sealed to an initiation device 34. A plurality of openable portions, such as openable ports 72, extend along the length of the ignition tube. The openable ports are arranged such that, upon opening, they will direct the heated products produced by ignition of the flammable gas at the solid gas generating pyrotechnic wafers 26 to ignite such. The ignition tube contains a flammable gas at a pressure between 300 and 1200 psig, and preferably between 400 and 900 psig, which is significantly greater than the pressure of the flammable gas in the embodiments illustrated in FIGS. 1 and 2. The construction of the ignition tube and the hermetic seal provided with the initiation device effectively diminishes the possibility of gas leakage over the expected lifetime of the inflator. An alternative construction can enclose the flammable gas in the ignition tube with a rupturable seal, or burst disc, mounted in front of the initiator, whereby activation of the initiator first ruptures the seal and then ignites the released flammable gas.

The ignition tube can be fabricated from metal or plastic, however, metal is presently preferred because it provides more consistent hermetic seals. The surfaces of the initiator which mate with the ignition tube are made of a material which is sufficiently similar to the mating surface of the ignition tube that the surfaces can be welded together to form a hermetic seal. When the ignition tube is formed from steel, the initiator may be a squib having a steel or Inconel housing. A charging port for the flammable gas may be provided at any convenient location on the ignition tube-initiator assembly. With certain of the flammable gases, such as nitrous oxide (N₂0) and other gases having a relatively high freezing temperature, the gas may be charged to the ignition tube as a cryogenically frozen solid particle immediately prior to forming the seal between the ignition tube and the initiator. This technique is more fully described in application Ser. No. 08/935,016, entitled "Pressurized Fluid-containing Airbag Inflator", which is incorporated by reference herein. The cryogenically frozen flammable gas can include a small concentration of helium or radioactive krypton-85(Kr-85) for their enhanced detectability in leak testing.

The openable portions or ports 72 provided along the tube may be formed by scoring, machining or otherwise providing preweakened portions along the length of the tube. The portions are preweakened to an extent that they will fracture and open when the interior of the tube is overpressured by activation of the initiator and ignition of the flammable gas. Alternatively, the portions or ports may initially be provided open and then sealed by adhesively or otherwise attaching a metal foil to the interior surface of the tube so that the foil extends over and seals the open portions or ports. Upon activation of the initiator and ignition of the flammable gas, the portions of the foil spanning the open portions or ports rupture allowing the ignition products to contact and ignite the pyrotechnic gas generant wafers.

The flammable gas can be provided at pressures of up to 1200 psi. In the embodiments of FIGS. 1 and 2, relatively low pressures are used, while relatively high pressures of the flammable gas are provided in the relatively small volume sealed container of the FIG. 3 embodiment. At the higher pressures within this range, the flammable gas, or a portion thereof, may be stored in a condensed, liquified state. Accordingly, the term flammable gas is intended to refer to flammable materials which are in the gaseous or vapor state at atmospheric pressure. The burn rate of pyrotechnic materials is proportional to the pressure.

The amount of flammable gas ignition material provided affects both (a) the amount of heat energy provided to ignite the pyrotechnic material and (b) the amount of rapidly developed gaseous products which become available to increase the internal pressure within the inflator and thereby increase the burn rate of the pyrotechnic material. These effects combine to provide a substantial improvement in controlling and diminishing the delay time occurring between ignition activation and airbag pressurization.

A hermetically sealed container with preweakened opening portions is particularly preferred in applications where greater energy input is required and/or where more control over the ignition location and ignition rate is desired.

Example

An inflator, similar to that illustrated in FIG. 3, 210 mm in length and 61 mm in diameter was charged with 280.5 grams of sodium azide gas generant. An ignitor was prepared from a tube of 0.89 mm thick stainless steel. The tube was externally scored to a depth of 0.38 mm to provide pre-weakened areas designed to rupture at an internal pressure of approximately 2000 psi. The igniter was charged with cryogenically frozen chunks of 0.10 g butane and 1.6 g nitrous oxide and a burst disc welded into a sealing position within the tube before the frozen chunks melted. A 90 mg zirconium potassium perchlorate initiator was mounted in the igniter tube so as to direct its ignition products at the burst disc, and the igniter tube mounted in the inflator.

For comparison purposes, a similar inflator was prepared with a pyrotechnic igniter containing a 127 mm length of 1.59 mm diameter rapid deflagration cord surrounded by 7 g of boron potassium nitrate. Aside from the igniter, the two inflators were essentially identical.

Figure 4:
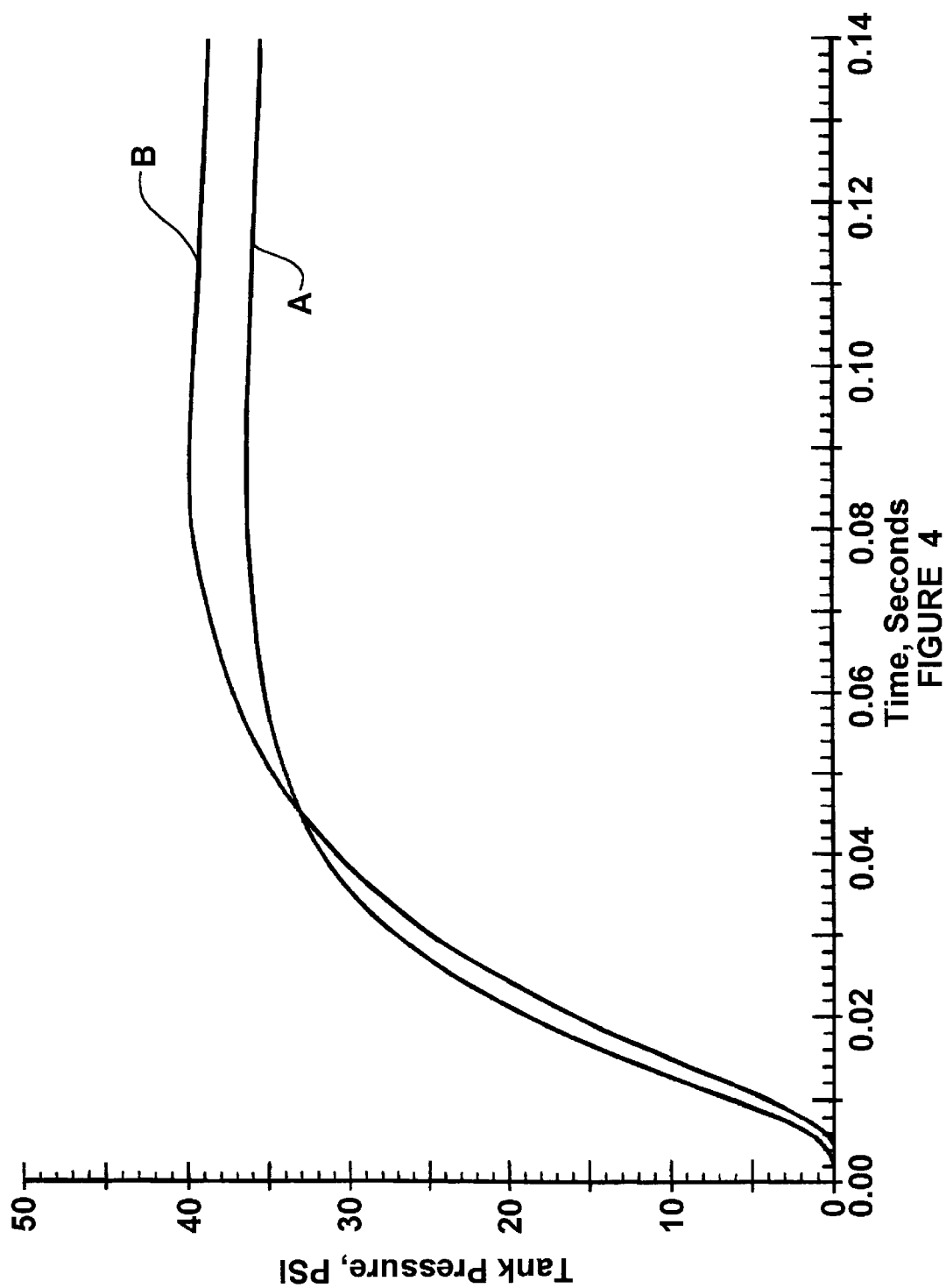
FIG. 4 is a plot of tank pressure over time for a flammable gas ignited inflator (A) and for a comparable pyrotechnic ignited inflator (B).

The two inflators were fired into a 100 liter tank and the pressure within the tank as a function of time after activation recorded. The results are shown in FIG. 4, wherein the tank pressure as a function of time is plotted for the flammable gas ignited inflator as Curve A and a similar plot for the pyrotechnic ignited inflator is plotted as Curve B. The amount of gas produced by both of the systems was essentially identical, however, the higher temperature of the gas produced with the pyrotechnic igniter resulted in a higher ultimate pressure. The pressure difference has a relatively minor effect on system performance, but the lower temperature produced in the flammable gas ignited system may be beneficial in reducing burns to the occupants. An important performance difference between the systems is the reduction of the delay time between activation and positive tank pressure demonstrated by the flammable gas system. Typically, pyrotechnic ignited pyrotechnic gas generant systems demonstrate delay times between 5 and 10 milliseconds. In this example, the flammable gas ignited system demonstrated positive tank pressure about 3 milliseconds faster than did the pyrotechnic ignited system.

It should be recognized that the foregoing description is provided to advise workers how to make and practice the invention and is not intended to limit the scope of the covered invention. The scope of the invention is defined by the following claims.

We claim:

1. An inflator suitable for use with an airbag passive restraint system, comprising:
    a housing containing a solid pyrotechnic gas generant,
    a quantity of a flammable gas which is sufficient to ignite said solid pyrotechnic gas generant, and
    an initiator which, upon activation, is capable of igniting said flammable gas.

2. The inflator of claim 1, further including:
    a container containing at least the major portion of said flammable gas.

3. The inflator of claim 2, wherein:
    said container also contains said solid pyrotechnic gas generant.

4. The inflator of claim 3, further including:
    an opening means capable of opening said container after said inflator is assembled to an essentially fluid tight condition.

5. The inflator of claim 3 wherein said container comprises at least one material selected from the group consisting of metal foil, plastic film metal-coated plastic film.

6. The inflator of claim 2, wherein:
    said container is sealed.

7. The inflator of claim 6, wherein:
    said initiator is capable of opening said sealed container when activated.

8. The inflator of claim 2, wherein said container includes openable areas adapted to open when the internal pressure in said container exceeds a preselected value.

9. The inflator of claim 2, wherein said flammable gas is held in said container at a pressure of up to 1200 psi.

10. The inflator of claim 2, wherein said initiator is joined to said container by a hermetic seal.

11. The inflator of claim 1, wherein said flammable gas is at a pressure of up to 20 psig.

12. The inflator of claim 1, wherein said flammable gas includes (a) at least one fuel gas selected from the group consisting of hydrogen, hydrocarbons and oxygen substituted hydrocarbons, and (b) at least one oxidizer selected from the group consisting of nitrous oxide and oxygen.

13. The inflator of claim 1, wherein said solid pyrotechnic gas generant comprises at least one material selected from the group consisting of metal azides, tetrazoles, triazoles, metal salts of dicyanamide, nitrate salts of amines, salts of 5-nitrobarbituric acid and salts of 5-nitroorotic acid.

14. The inflator of claim 1, wherein said flammable gas includes at least one exothermically decomposable gas from the group consisting of nitrous oxide, organic peroxides, hydrazines and acetylenes.

15. The inflator of claim 1, wherein said flammable gas has an auto-ignition temperature between 300° F. and 450° F.

16. A method of producing a product gas suitable for inflating an inflatable article, comprising:

providing a quantity of a solid pyrotechnic gas generant capable of producing said product gas in a housing, enclosing a flammable gas within said housing, igniting said flammable gas, igniting said solid pyrotechnic gas generant by contacting it with the ignition products of said ignited flammable gas, and allowing the product gas produced by the ignited gas generant to discharge from said housing.

17. The method of claim 16, wherein said solid pyrotechnic gas generant and at least a major portion of said flammable gas are provided in a sealed container before being placed within said housing.

18. The method of claim 17, wherein activation of an initiator results in opening said sealed container and ignition of said flammable gas.

19. The method of claim 17, wherein said sealed container is opened after said housing is sufficiently assembled to be substantially fluid tight.

20. The method of claim 16 wherein said flammable gas comprises a gaseous fuel and a gaseous oxidant.

21. The method of claim 16 wherein said flammable gas comprises an exothermically decomposable gas.

22. The method of claim 16 wherein said flammable gas is sealed in a container before being placed within said housing.

23. The method of claim 22 wherein the sealing of said container comprises providing a hermetic seal joining said container to an initiator which is capable of igniting said flammable gas.

24. The method of claim 22 wherein said container is provided with openable structure which opens upon ignition of the flammable gas to allow the ignition products of the flammable gas to contact and ignite the solid pyrotechnic gas generant.

25. The method of claim 22 wherein the pressure of said flammable gas in said container is within the range of 300 to 1200 psi.

26. The method of claim 22 wherein said flammable gas has an auto-ignition temperature between 300° F. and 450° F.

27. The method of claim 17 wherein said flammable gas in said sealed container is at a pressure sufficient to cause at least a portion of said flammable gas to be condensed to a liquid.

* * * * *